June 1, 1948.  R. E. BURK ET AL  2,442,342
PROCESS OF MAKING ISOPROPYL BENZENE
Filed Nov. 30, 1942
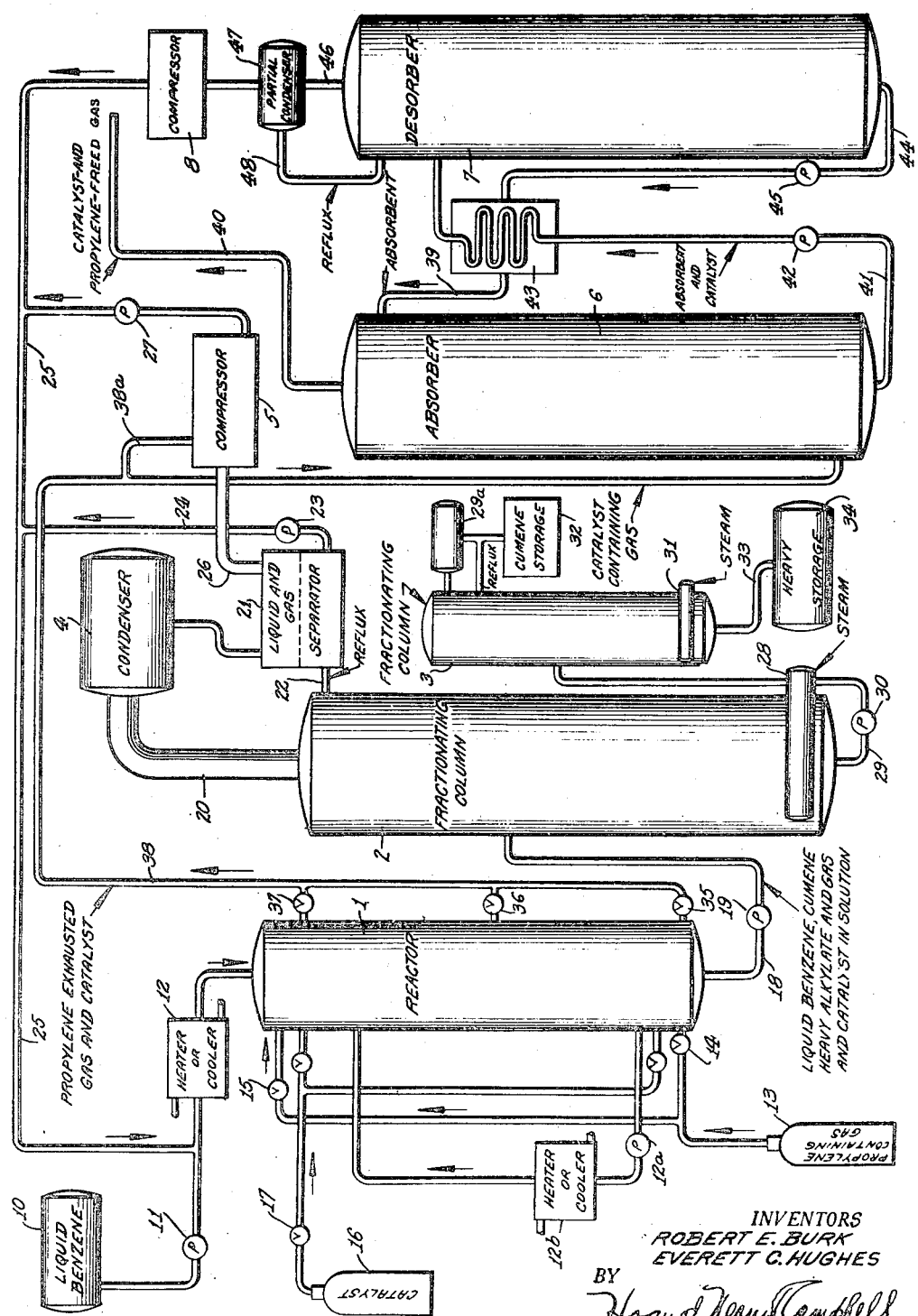
INVENTORS
ROBERT E. BURK
EVERETT C. HUGHES
BY
Hogan Henry Campbell
ATTORNEYS Patented June 1, 1948

2,442,342

UNITED STATES PATENT OFFICE 2,442,342

PROCESS OF MAKING ISOPROPYL BENZENE

Robert E. Burk and Everett C. Hughes, Cleveland Heights, Ohio, assignors to The Standard Oil Company, Cleveland, Ohio, a corporation of Ohio Application November 30, 1942, Serial No. 467,425

3 Claims. (Cl. 260—671)

This invention relates to the production of cumene (isopropyl benzene) from propylene and benzene utilizing hydrogen fluoride, and preferably with a trace of boron trifluoride, as the primary catalytic agent.

It has been proposed previously to form alkylated aromatics by condensing benzene and olefins, including processes in which the olefin is propylene, using hydrogen fluoride as a catalyst (J. Am. Chem. Soc., 60, 986 and 2952 (1938), 61, 1012 (1939)). In such processes, and other similar ones that have been described in the literature, the reacting materials used were relatively pure compounds, the reaction was carried out at a low temperature and at atmospheric pressure, the reaction period extended over long intervals of time. There is nothing in such prior disclosures to indicates that cumene could be produced from relatively impure benzene and propylene, such as technical or commercial grades of benzol, and gases containing propylene in small amounts and mixed with other gases normally contained in refinery or cracking gases. Nor is there any indication that the prior processes could be carried out continuously accompanied by a recovery of the unreacted raw materials which could be recycled, and with the recovery and re-use of the hydrogen fluoride catalyst. In addition there was no suggestion that the reaction time could be reduced to a matter of seconds or minutes, or at an elevated temperature to obtain high yields and efficient operation under conditions prevailing in commercial operations.

It has been discovered that cumene can be made utilizing hydrogen fluoride, and preferably with a trace of boron trifluoride, as the primary catalytic agent, and with the use of such raw materials, under such temperature and pressure conditions, and for such a period of time as would be indicated by the prior art as inoperative or impractical, but which in accordance with this invention have been found to be decidedly advantageous and practical on a commercial scale. It has also been discovered that this process may be carried out in a continuous manner using substantially all of the raw materials and without loss of the catalyst.

The invention has as one of its objects the provision of a process in which refinery gases, containing gases other than propylene, such as unsaturated or saturated hydrocarbons, carbon oxides and sulfur-containing gases, may be used as the source of propylene. The process thus renders it unnecessary to fractionate out and concentrate the propylene from any cuts containing the same.

A further object of the invention is to provide a process which permits the use of impure benzene having appreciable quantities of lower boiling components or of higher boiling components or both, such as are present in commercial or technical grades of benzol.

An additional object of the invention is to provide a process in which the reaction, and other phases of the process, are carried out at a temperature above the boiling point of hydrogen fluoride (67° F.), and in particular at temperatures which would be encountered in an economical commercial operation, i. e., about 80 to 210° F.

It is an additional object of the invention to provide a process which may be operated under pressure, but which requires only relatively low pressures to obtain efficiency and good yields, thereby eliminating special high pressure equipment.

As a further object the invention provides a process which may be carried out in conventional refining equipment without the use of special alloys or metals for the various reactors, fractionators, other reaction vessels and piping.

An additional object of the invention is to provide a process which may be operated continuously, in which the propylene contained in the gaseous feed may be substantially all utilized, and in which any unreacted benzene is recovered and recycled so as to utilize substantially all of the raw materials in an efficient and continuous operation.

Still a further object of the invention is the provision of a continuous process in which the catalyst is recovered and can be reused in the process so as not to require any substantial additional amounts of catalyst after the process is set in operation and in which process this recovery is effected continuously and with the reuse of the recovering agent.

A further object of the invention is to carry out the process under conditions such that the reaction period is extremely short but, which, nevertheless, results in high yields and a large or substantially complete utilization of the raw materials.

Still a further object of the invention is the provision of a process which, irrespective of the heterogeneous or impure nature of the raw materials, produces large yields of cumene.

The invention may be understood in connection with the following description and the sheet of drawings containing a single figure which is explanatory of one of the many embodiments of the process, and which will be referred to in the general description of the invention and the specific illustrative examples.

The process consists in its simplest form of reacting the propylene-containing gas and the liquid benzene under appropriate temperature and pressure conditions as described hereinafter; this is accomplished in a relatively short length of time in a reactor 1 in the presence of a catalyst; the materials may be passed through the reactor in counter-current or concurrent flow or both. Under the conditions of temperature and pressure preferred, the reaction will yield a liquid phase comprising unreacted benzene, cumene and any higher-boiling alkylated aromatics and other higher boiling compounds (referred to as heavy alkylates), and in which liquid a portion of the hydrogen fluoride catalyst and other gases may be dissolved. This liquid phase from the reaction is fed to a fractionating column 2 and the benzene, catalyst and gases are separated from the cumene and any heavy alkylates. The cumene may be separated from the heavy alkylates in a fractionating column 3 and further purified as desired. The benzene, catalyst and gases are removed at the top of the column 2, and may be condensed in a condenser 4, and the liquids and gases separated. The liquid, mostly benzene and catalyst dissolved therein, is returned to the initial benzene feed. The gases are compressed in a compressor 5 and cooled, and the liquid also returned to the initial benzene feed. Any uncondensed gas may be added to the gaseous phase from the reactor. In this way all of the unreacted benzene and all of the catalyst leaving the reaction zone as a liquid phase are recovered and returned to the reaction zone.

The gaseous phase leaving the reactor comprises propylene-exhausted gas, catalyst in the gaseous phase, and some benzene in the vapor phase as a result of the partial pressure effect in the reactor. These gases are passed through an absorber 6, preferably flowing counter-current to an absorbent, which absorbs the catalyst and benzene from the gases. The propylene-freed and catalyst-freed gas passing out of the absorber may be used for any purposes desired. The absorbent containing the catalyst and benzene may then be passed through a desorber 7, in which the catalyst and benzene may be desorbed from the absorbent, compressed by a compressor 8, and returned to the initial benzene feed. The desorbed absorbent may be returned to the absorber.

As illustrative of the propylene-containing gas which may be used in accordance with the invention, the process has been practiced successfully utilizing natural gases containing but about 10 to 15% by volume of propylene, and refinery gas from cracking operations containing as low as about 7.0% propylene, other unsaturates such as about 30% ethylene, more than 1% each of hydrogen sulfide and carbon dioxide. Even though the gaseous feed contains small amounts of propylene and larger amounts of other gases, substantially all of the propylene is utilized, and little or no ethyl benzene is formed as a result of the presence of the ethylene. The presence of hydrogen sulfide, carbon dioxide, and other gases does not poison the catalyst or otherwise interfere with the reaction. Gases obtained from high temperature cracking process similarly may be used. It is preferred not to use gases containing a large amount of unsaturates heavier than propylene.

The benzol that may be used in accordance with the process may be impure or technical grades from coal tar distillatiton, from dearomatization of petroleum fractions, by hydroforming, aromatizing, high temperature cracking, or dehydrogenation of naphthenic hydrocarbons, or any other convenient source. Examples are the so-called "2° benzene" containing about 10% of compounds having a boiling point lower than that of benzene, such as lower boiling paraffins and naphthenes, olefins, carbon disulfide, etc. Another benzene which may be used is so-called "90% benzol" which contains about 10% higher-boiling compounds, mostly aromatics, but including non-hydrocarbon impurities such as thiophene and pyridine. It is particularly significant that nitrogen containing compounds such as pyridine or unsaturated compounds may be present as impurities without deleteriously affecting the process of the invention.

The temperature of the reaction is carried out above the boiling point of hydrogen fluoride, for example, within the range of 80 to 210° F., preferably 90 to 150° F. The process, therefore, does not require refrigeration as is necessary for lower reaction temperatures heretofore used, or a high heat in-put as would be required for higher temperature reactions.

The pressure may be varied over a wide range, but under the other conditions preferred a pressure of atmospheric to 250 pounds per sq. in. pressure is utilized. Under these conditions the hydrogen fluoride catalyst will be gaseous except for such as may be dissolved in the benzene in the liquid phase.

The time in which the reaction occurs will depend upon the size of the reacting vessel, and the rate and nature of the flow of materials through it. Under the preferred conditions the time of reaction is very short and is of an order of from one-third minute to fifteen minutes, a time of from 20 to 300 seconds being entirely satisfactory.

The amount of the catalyst employed is not critical except that a sufficient amount must be employed under the reacting conditions to permit the reaction to proceed to the extent of completion desired. Larger amounts permit shorter times of reaction, give better yields, and corresponding alterations in temperature and pressure. Under the conditions of the process it is preferred to employ the minimum amount which will achieve the desired completeness of the reaction.

The absorbent for separating the catalyst and benzene vapor from the propylene-freed gas may be any of a large number of compounds which form a complex with or otherwise absorb hydrogen fluoride.

Examples are dihydroxyfluoboric acid; substituted and unsubstituted diaryl ketones, such as benzophenone; amines, basic nitrogen heterocyclic compounds, and other nitrogenous basic compounds such as diphenylamine, coal tar bases, and chlorinated amines; certain aromatic hydrocarbons; ethers such as anisole and diphenyl ether; and certain metal fluorides. The temperature under which the absorption operation is carried out will depend upon the absorbent used and the pressure conditions maintained and is such as to secure a desirable or maximum absorption. When benzophenone is the absorbent, a temperature from near the melting point of the benzophenone up to 300° F. may be used, preferably 160 to 210° F. The desorbing may be accomplished at a higher temperature at which benzene is readily removed and the complex is destroyed at least to some extent to free the catalyst in the vapor form. In the case of benzophenone a temperature within the range of 300 to 530° F. may be used for desorption. Any pressure may be used in the absorbing and desorbing operations.

Referring more particularly to the embodiment of the invention as illustrated in the drawings, the liquid benzene may be pumped from a storage container 10 by a pump 11, and passed through a heater or cooler 12, into the top of the reactor 1. This may be a packed column since the latter is suitable for either concurrent or countercurrent flow. The reactor may be another type of column such as a bubble-plate column if countercurrent flow is utilized, or it may be a stirred gas-liquid contactor of any kind.

The propylene-containing gas may be fed from a supply 13, through a valve 14, and introduced into the bottom of the reactor 1, through a valve 14, if the flow is to be countercurrent or through a valve 15 at the top of the column if the flow is to be concurrent, or through both valves if both types of flow are used.

A reserve supply of the catalyst in the container 16, may be admitted to the reactor by a valve 17, at either the top or the bottom of the reactor, if it is necessary to compensate for any loss in catalyst during the process.

The heat of reaction is not large and heat may be added or removed depending on radiation, etc. The temperature in the reactor may be maintained at the desired point generally by heating or cooling the benzene feed in the heater or cooler 12. If this is not sufficient, benzene may be withdrawn by the pump 12a, passed through a heater or cooler 12b and returned to the top of the reactor.

The liquid phase from the reactor 1, which will comprise the reacted and unreacted benzene together with some catalyst and gases dissolved therein, may be removed through the conduit 18, and discharged by the means of a pump 19 into the fractionating column 2. Since the reactor generally will be operating at a higher pressure then the fractionating column 2, the pump 19 may be automatically controlled by a float in the bottom of the reactor.

The vaporized benzene, catalyst, and gases are removed from the fractionating column 2 through the discharge conduit 20 and condensed in a condenser 4 and then passed to a liquid and gas separator 21. A portion of the liquid separated may be refluxed into the column 2 through the conduit 22 and the balance returned by the pump 23 through the conduit 24 to the benzene return line 25. The gaseous phase from the liquid and gas separator 21 may be removed through the conduit 26 and compressed and cooled in the compressor 5 and the condensed liquid returned to the reactor by the pump 27 through the benzene return line 25.

The fractionating column 2 may be equipped with a reboiler 28, to vaporize the reflux, and the liquid at the bottom of the column 2 may be withdrawn through the conduit 29 and moved by the pump 30 to the fractionating column 3 which may be equipped with a condenser 29a, reflux conduit and reboiler 31. The cumene is withdrawn from the top of the column 3 and condensed in the condenser 29; a part of the condensate may be refluxed and the balance sent to the cumene storage tank 32. The higher-boiling products, referred to as heavy alkylates, may be withdrawn from the bottom of the column 3 through a conduit 33 and sent to a storage tank 34. By this process all of the liquid phase of the reaction will have been separated into finished alkylated products or returned to the reaction chamber.

The gaseous phase of the reaction, comprising the propylene-freed gas, the catalyst and any benzene in vapor form is removed from the reactor 1 by way of one of the valves 35, 36, or 37, depending on whether the operation is countercurrent, concurrent, or both. This gaseous phase is passed through the conduit 38 into the bottom of the absorber 6 which may be a packed column or a bubble-plate column. The uncondensed gas from the compressor 5 may be added to the conduit 38 through a conduit 38a. The absorbent is introduced into the top of the absorber 6 through a conduit 39. In the absorber the benzene vapor may be dissolved in the absorbent and the catalyst is combined in the form of a complex or loose chemical combination.

Propylene-freed gas from which the catalyst and benzene is removed in the absorber 6 is withdrawn from the top of the absorber through a conduit 40 and may be used as fuel or other purposes depending upon its composition.

The absorbent charged with the catalyst and benzene is removed from the absorber 6 through a conduit 41 and pumped by a pump 42 through a heat exchanger 43 into the desorber 7 where the catalyst and benzene are to be removed.

The absorbent freed from the catalyst or a substantial portion of it is withdrawn from the desorber 7 and returned through the conduit 44 by means of a pump 45 through the heat exchanger 43 and conduit 39 into the absorber where the absorbent can absorb an additional amount of catalyst from the gas coming in through the conduit 38. In this manner the absorbent is continuously recycled and re-used without the need for an additional amount of absorbent once the system is set in operation.

The catalyst and benzene which are removed in the desorber 7 are withdrawn through a conduit 46, and partially condensed in the condenser 47 to provide a reflux through the conduit 48. The uncondensed gas is compressed by the compressor 8 and fed into the benzene return-feed conduit 25. If desired a separate line may be used to return the gaseous or liquid phases from the compressor 8. Thus all of the valuable products are removed from the gaseous phase, as well as the liquid phase, and returned to the reaction zone. The only final products of the reaction are the cumene, a small amount of heavy alkylates, and the propylene-freed gas.

As illustrative of the process but not as a limitation on the scope of the invention heretofore defined, the following examples are given:

hydrogen fluoride is promoted with a trace of boron trifluoride and very small amounts of the

| Example | I | II | III | IV |
|---|---|---|---|---|
| Liquid Charge Stock | 2° Benzene | 90% Benzol | 2° Benzene | 2° Benzene. |
| Gaseous Charge Stock | 15% Propylene, 85% Saturates. | 10.2% Propylene, 89.8% Saturates. | 13% Propylene, 19.1% Ethylene, 1% H²S, 2% CO². | 11.8% Propylene, 88.2% Saturates. |
| Aver. Reactor Temp | 107° F | 108° F | 111° F | 113° F. |
| Reaction Pressure (Gauge) | 150#/in² | 150#/in² | 102#/in² | 102#/in² |
| Contact Time in Reactor | 174 sec | 179 sec | 34 sec | 29 sec. |
| HF used (Wt.% on benzene Charge) (containing trace of BF₃). | 5.7% | 6.6% | 13.9% | 21.5%. |
| Propylene Charged ¹ | .507#/hr | 0.367#/hr | 0.66#/hr | 0.84#/hr. |
| Benzene Charged | 5.61#/hr | 5.14#/hr | 7.21#/hr | 5.03#/hr. |
| Mol Ratio of Benzene to Propylene | 6.0 | 7.6 | 5.9 | 3.22. |
| Cumene Formed | 1.21#/hr | 0.733#/hr | 1.03#/hr | 1.58#/hr. |
| Heavy Alkylates Formed ² | 0.092#/hr | 0.169#/hr | 0.38#/hr | 0.54#/hr. |
| Benzene Recycled | 4.79#/hr | 4.58#/hr | 6.36#/hr | 3.75#/hr. |
| Unreacted Propylene in Exhaust Gas | 0.023#/hr | None | 0.10#/hr | None. |

¹ The amount of propylene charged was calculated from the amount of unreacted propylene in the exhaust gas and propylene combined in the cumene and heavy alkylates.
² Measured by fractional distillation of products.

From the consideration of the above examples it will be seen that a variety of liquid and gaseous charge stocks can be used under a variety of different reaction conditions. In all instances the propylene is either completely reacted or reacted to a high degree. In several examples the amount of cumene formed is about 80 to 95% of that theoretically possible based on the amount of benzene used in the reaction and about 60 to 85% of the amount theoretically possible based on the amount of propylene reacting. The amount of cumene formed is excellent considering the impurity of the reaction materials.

In the above examples the catalyst recovery was accomplished by means of benzophenone as the absorbent operating within the temperature and pressure ranges heretofore indicated as desirable.

It is preferred that the entire process should be carried out while all of the products and reacting ingredients are in an anhydrous condition. To accomplish this, suitable driers or dehydrators may be used to dry the raw materials if necessary or to remove water at any stage of the process as may be found expedient.

In the above process no provision is made for recycling the gas after removal of the catalyst therefrom, even though the conditions of the reaction are such that not all of the propylene is reacted. While such recycling may be practiced it is generally not economical and it is preferred to react as much of the propylene as possible under the conditions of the reaction and discharge the propylene-freed gas from the system.

It is recognized that other reactions may take place but these are not significant in the process. For example, there may be a slight polymerization of the olefins, or the impurities may be alkylated, cracked, polymerized or isomerized. Olefins other than propylene may alkylate to a slight extent. Any such products formed which have a higher boiling point than the cumene will be separated with the heavy alkylate. Any products with a boiling point lower than cumene will be separated with the benzene and recycled. They may be further reacted and changed to a gas and pass out with the gaseous phase or they may be further modified to have a boiling point higher than that of cumene and separated as heavy alkylate. If they accumulate they may be withdrawn as a separate fraction.

The catalyst used in the process may be hydrogen fluoride, but increased yields and shorter reaction time are possible if the catalyst is promoted. The process is greatly facilitated if the latter may be used, i. e., $1/100$ to $1/20,000$. Much larger amounts of boron trifluoride may be used if desired, but the advantages gained from higher amounts may not outweigh disadvantages. The use of a trace of boron trifluoride and the decided acceleration of the process thereby is of particular significance, since such a small amount does not materially increase the cost of the process and does not introduce difficulties in recovery of the catalyst and corrosion problems.

It will be understood that the process is capable of many variations or embodiments and may be operated under a wide variety of conditions as described heretofore. As illustrative, but not as exhaustive of such possibilities, the absorber and desorber may be a single column in which different temperatures are maintained for absorption and desorption. The absorber may be any liquid-gas contact apparatus. Under appropriate conditions all of the catalyst may be recovered by the benzene, thus eliminating any need for an absorption and desorption system. Under different circumstances the content of the several phases may be different than that described in the specific examples or in different forms, and appropriate modifications may be required as will be understood in order to have an entirely liquid or vapor phase. It is intended that all such variations and modifications are to be included as one within the following claims.

We claim:
1. A continuous process for producing cumene from a refinery gas containing propylene and a technical grade of benzene containing appreciable amounts of impurities, which process comprises contacting the propylene-containing material with a stoichiometric excess of the benzene-containing material in a reaction zone in contact with hydrogen fluoride promoted by at least a trace of boron trifluoride as the primary catalytic agent under alkylating reaction conditions including a temperature and pressure to maintain the hydrogen fluoride and boron fluoride in the vapor phase, withdrawing the unreacted benzene and cumene from the reaction zone as a liquid phase, separating the benzene from the cumene and returning the separated benzene to the reaction zone, withdrawing the gaseous phase from the reaction zone comprising the unreacted gases in the refinery gas and the catalyst in the vapor phase, treating said gaseous phase with an absorbent to absorb the catalyst contained in said vapor phase, discharging the catalyst-freed gas, desorbing the catalyst from the absorbent, returning the catalyst to the re- action zone, and transferring the desorbed absorbent to the absorbing zone.

2. A continuous process for producing cumene from propylene and benzene which process comprises reacting the propylene with a stoichiometric excess of benzene in a reaction zone in contact with hydrogen fluoride promoted by at least a trace of boron trifluoride as the primary catalytic agent under alkylating reaction conditions including a temperature and pressure to maintain the hydrogen fluoride and boron fluoride in the vapor phase, withdrawing the unreacted benzene, cumene and other higher-boiling and alkylated products with any catalyst and gases dissolved therein as a liquid phase from the reaction zone, separating the benzene and any catalyst and gases from the cumene and higher-boiling and other alkylates and returning the separated benzene and catalyst to the reaction zone, withdrawing from the reaction zone the vapor phase comprising the propylene-freed gases and catalyst in the vapor phase, treating the said gaseous phase with an absorbent to absorb the catalyst in said vapor phase, desorbing the catalyst from the absorbent, and returning the catalyst to the reaction zone.

3. A continuous process for producing cumene from a refinery gas containing propylene and a technical grade of benzene containing appreciable amounts of higher or lower boiling impurities, which process comprises continuously introducing the propylene-containing material and the benzene-containing material into a reaction zone in contact with hydrogen fluoride promoted by at least a trace of boron trifluoride at a temperature at which the reaction proceeds and at a pressure to maintain the hydrogen fluoride and boron trifluoride in the vapor phase at said temperature, the benzene being in an amount in excess of the stoichiometric requirement for the reaction with the propylene, permitting the reaction to proceed for a time of the order of 20 to 300 seconds, continuously withdrawing the unreacted benzene, cumene and other higher-boiling and alkylated products with any fluoride and gases dissolved therein as a liquid phase from the reaction zone, continuously separating the benzene and any fluoride and gases from the cumene and higher-boiling products and other alkylates and continuously returning the separated benzene and fluoride to the reaction zone, continuously separating the cumene from the higher-boiling products and other alkylates, withdrawing from the reaction zone the vapor phase comprising the unreacted gases in the propylene-containing raw material in admixture with said fluorides and any benzene in the vapor phase, continuously treating the said gaseous phase with an absorbent in an absorbing zone to absorb said fluorides with any benzene contained in said vapor phase, discharging the fluoride-freed and benzene-freed gas, continuously desorbing said fluorides and benzene from the absorbent, continuously returning the fluoride and benzene to the reaction zone, continuously transferring the desorbed absorbent to the absorbing zone.

ROBERT E. BURK.
EVERETT C. HUGHES.

REFERENCES CITED

The following references are of record in the file of this patent:

UNITED STATES PATENTS

| Number | Name | Date |
|---|---|---|
| 1,933,434 | Hofmann et al. | Oct. 31, 1933 |
| 1,953,702 | Davidson | Apr. 3, 1934 |
| 2,240,134 | Egloff (A) | Apr. 29, 1941 |
| 2,275,312 | Tinker et al. | Mar. 3, 1942 |
| 2,300,235 | Pines et al. | Oct. 27, 1942 |
| 2,318,765 | Egloff (B) | May 11, 1943 |
| 2,324,784 | Lieber | July 20, 1943 |
| 2,343,870 | Kaplan | Mar. 14, 1944 |
| 2,372,320 | Frey | Mar. 27, 1945 |
| 2,396,965 | Passino | Mar. 19, 1946 |
| 2,396,966 | Passino (II) | Mar. 19, 1946 |